Figure 1:
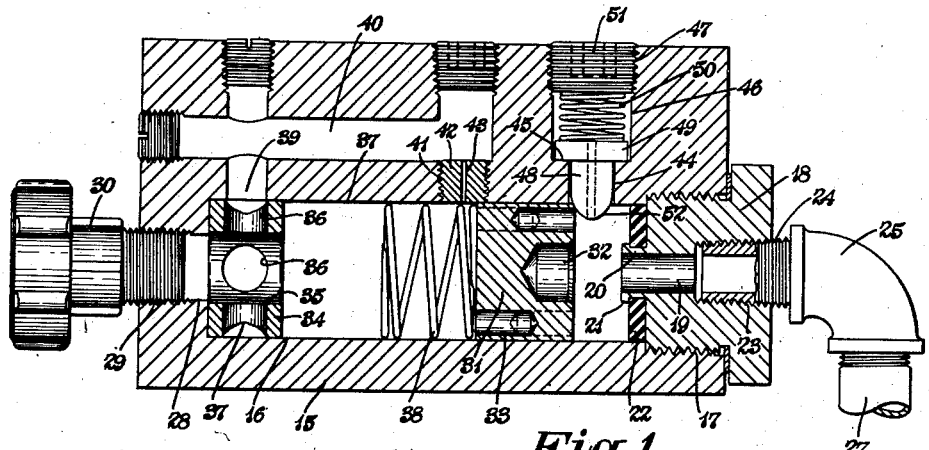

Feb. 5, 1957 P. D. MADAK 2,780,240
FLUID SAFETY CHECK AND CUSHIONING DEVICE
Filed June 3, 1952 2 Sheets-Sheet 1

INVENTOR.
Paul D. Madak
BY Frease & Bishop
ATTORNEYS

Feb. 5, 1957 P. D. MADAK 2,780,240
FLUID SAFETY CHECK AND CUSHIONING DEVICE
Filed June 3, 1952 2 Sheets-Sheet 2

INVENTOR.
Paul D. Madak
BY Frease & Bishop
ATTORNEYS

United States Patent Office 2,780,240
Patented Feb. 5, 1957

2,780,240

FLUID SAFETY CHECK AND CUSHIONING DEVICE

Paul D. Madak, Canton, Ohio

Application June 3, 1952, Serial No. 291,378

4 Claims. (Cl. 137—496)

The invention relates to fluid restricting devices for application to fluid operated equipment, to provide a check against fluid thrust, a cushion on the action of fluid force, a safety device against leakage in the fluid system and a brake to start or stop actions of fluid force, and the present application is a continuation in part of my copending application, Serial No. 269,204, filed January 31, 1952, now abandoned.

While said copending application was more particularly concerned with hydraulic brake systems for motor vehicles, the present invention is especially adapted to industrial use, for application to any type of fluid operated equipment.

The object of the invention is to provide such a device located between the pump or other source of fluid pressure and a fluid operated apparatus to provide a check against hydraulic thrust and a cushion upon the action of hydraulic force, as well as a safety device against leakage in the hydraulic system and a brake with ability to start or stop actions of hydraulic force.

Another object is to provide such a device comprising a cylinder having an inlet communicating with a pump or other source of fluid pressure and an outlet communicating with the fluid operated apparatus, a piston being located within the cylinder and having one or more tortuous passages therethrough, so arranged that the piston will be rotated by the passage of fluid therethrough to produce a cushioning effect.

A further object is to provide such a device having a turbulence mixer within the cylinder for increasing the cushioning effect.

A still further object is to provide a device of the character referred to adapted for use upon either a single acting or double acting fluid operated apparatus.

Another object of the invention is to provide such a device having means therein controlled by the fluid pressure for normally limiting the movement of the piston within the cylinder.

A further object is to provide a device of this character in which, in the event of leakage between the pump and the safety device the piston will be moved backward beyond its normal limits closing the inlet to the cylinder.

Figure 6:
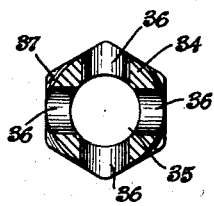
Figure 5:
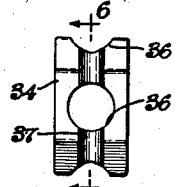
Figure 9:
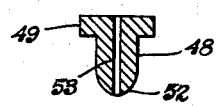
Figure 7:
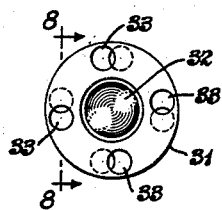
Figure 8:
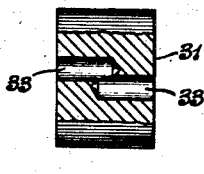
Figure 10:
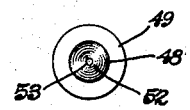
Figure 11:
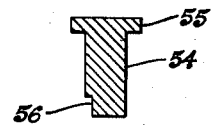
Figure 12:
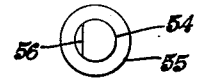
Figure 4:
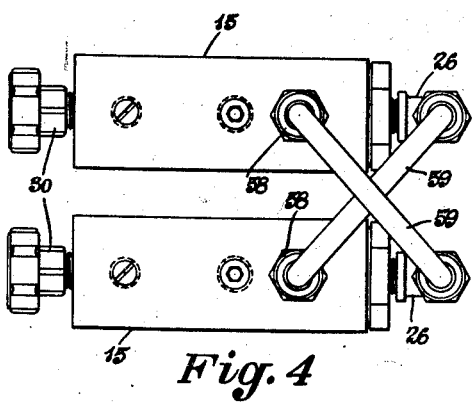
Figure 2:
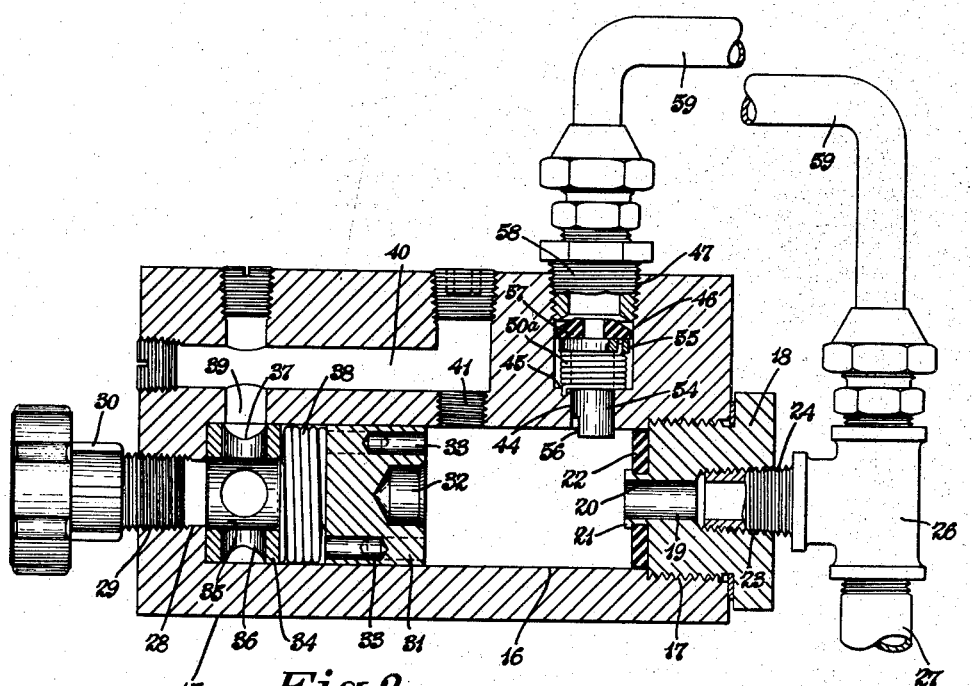
Figure 3:
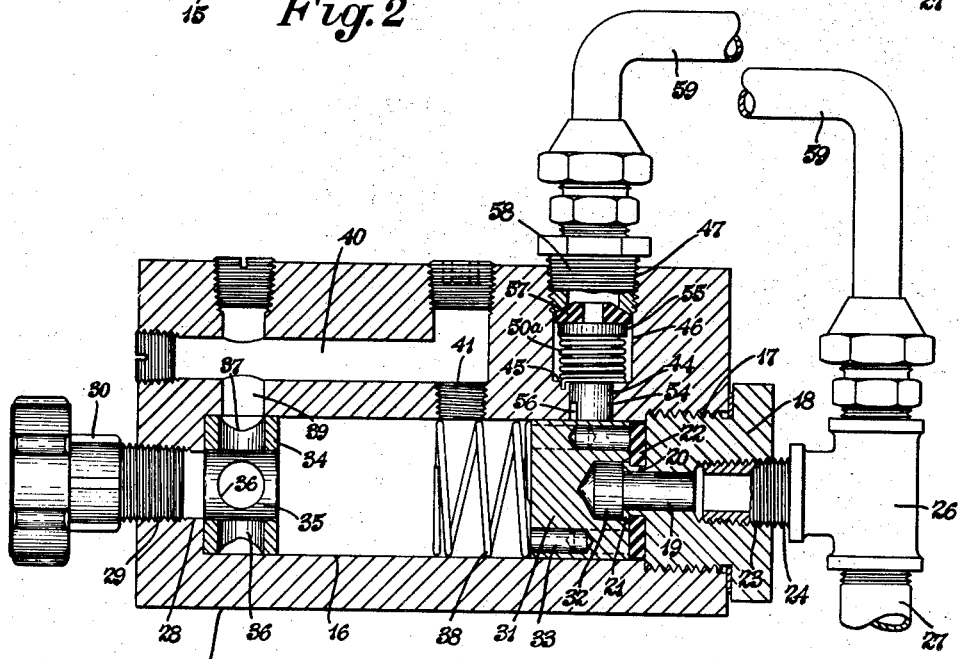

The above and other objects apparent from the drawings and following description, may be attained, and the above described advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawings, in which:

Fig. 1 is a longitudinal, sectional view through one of the fluid safety check and cushioning devices adapted for single action for connection to a vertical operation or single acting fluid operated apparatus, showing the parts in the normal or unoperated position;

Fig. 2 a similar view showing the device arranged for double action for connection to a horizontal operation or double acting fluid operated apparatus, showing the parts in the operated position;

Fig. 3 a view similar to Fig. 2 showing the parts in the position they assume in case of failure or leakage in the fluid inlet line;

Fig. 4 a top plan view, on a smaller scale, of two units connected for double action;

Fig. 5 a side elevation of the turbulence mixer forming a part of the device;

Fig. 6 a section taken as on the line 6—6, Fig. 5;

Fig. 7 an end elevation of the piston;

Fig. 8 a section through the piston, taken as on the line 8—8, Fig. 7;

Fig. 9 a longitudinal, sectional view through the stop pintle used in the single-acting device;

Fig. 10 an end elevation of the stop pintle;

Fig. 11 a longitudinal, sectional view through the stop pintle used in the double-acting device; and, Fig. 12 an end elevation of this stop pintle.

For either the single action or double action arrangement the device includes a housing 15 having a cylinder bore 16 therein threaded at one end as at 17 to receive the inlet fitting 18. This inlet fitting has a reduced, central bore 19, surrounded at the inner end of the fitting by the neck 20 having the shouldered outer end 21.

A rubber gasket 22 is mounted against the inner end of the fitting 18 and provided with a central opening fitting around the neck 20 behind the shoulder 21.

The outer end of the bore 19 is enlarged and threaded, as at 23, to receive the fluid inlet pipe 24 which is connected by an elbow 25, or T-connection 26, to the fluid supply pipe 27 leading from a pump, compressor or other source of fluid pressure.

The opposite end of the cylinder bore 16 communicates with the reduced outlet passage 28, which is threaded as at 29 to receive a suitable fitting 30 by means of which the device may be connected to any fluid operated apparatus or equipment to be controlled thereby.

Within the cylinder 16 is slidably located a piston 31 having a recess 32 at one end adapted to receive the shouldered end 21 of the neck 20, as will be later described.

One or more tortuous passages are located longitudinally through the piston. As best shown in Fig. 8, each of these tortuous passages comprises two laterally off-set passages 33 bored part way through the piston from opposite ends thereof and communicating laterally with each other at their inner ends. It will be obvious that as fluid passes through this tortuous passage it will be caused to change direction twice, changing first from a longitudinal to a lateral direction and then from a lateral to a longitudinal direction. Obviously this changing of direction of the fluid results in slowing down the movement of the fluid through the passage in one piston. It has also been found in actual operation that when fluid under pressure is forced through this tortuous passage it causes the piston to rotate within the cylinder.

In order to increase the cushioning effect, a turbulence mixer, indicated at 34, may be located within the cylinder 16 at a point spaced from the piston, preferably at or near the outlet end of the cylinder as shown in the drawings. This turbulence mixer may be of hexagonal shape as shown in the drawings, or other polygonal shape, or may be circular in cross section and of slightly less diameter than the cylinder bore 16.

A central passage 35, of substantially the same diameter as the reduced outlet passage 28, is located longitudinally through the turbulence mixer and communicates with a plurality of radial passages 36 extending through the periphery of the turbulence mixer and communicating with the peripheral groove 37 therein. The coil spring 38 is interposed between the piston and the turbulence mixer.

A transversely disposed passage 39 communicates with the cylinder, near the outlet end thereof, and with a longitudinal passage 40 which communicates with the transversely disposed screw threaded passage 41 communicating with an intermediate point of the cylinder 16.

In case of very low pressure operations a restricter plug 42, having a reduced central passage 43 therein, may be located in the passage 41, as shown in Fig. 1. In high pressure operations the passage 41 may remain unobstructed as shown in Figs. 2 and 3.

For the purpose of normally limiting the backward movement of the piston 31, toward the inlet end of the cylinder, a stop pintle is located within the transversely disposed passage 44 communicating with the cylinder at a point spaced from the inlet end thereof. This passage is shouldered as at 45 and enlarged in diameter as at 46, the outer end thereof being screw threaded as at 47.

In the single action unit, as shown in Fig. 1, a stop pintle 48 is preferably used having an enlarged head 49 adapted to be held in contact with the shoulder 45 of the passage by means of the coil spring 50 interposed between the pintle and the screw plug 51 located in the threaded outer end 47 of the passage.

The inner end of the pintle 48 is of substantially cone shape with rounded end as indicated at 52. Preferably a reduced passage 53 is located longitudinally through the pintle 48, so as to admit oil pressure from the cylinder to the enlarged portion 46 of the passage, above the head of the pintle, in order to prevent oil pressure in the cylinder from overcoming the pressure of the spring 50.

When the device is used as a double action unit, as shown in Figs. 2, 3 and 4, a modified form of pintle may be used. This pintle is indicated at 54 in Figs. 2, 3, 11 and 12, and is provided with the enlarged head 55 and the lower end is cut away as at 56, on the side facing toward the piston 31.

The stop pintles 48 or 54 are for purpose of normally preventing the piston from moving into closing contact with the inlet until such time as a leak may develop in the inlet pipe, causing a predetermined pressure on the outlet side of the piston, from the apparatus being controlled.

A pig-tail coil spring 50a is located around the pintle 54 between the head 55 thereof and the shoulder 45, so as to urge the pintle upward to seat the preferably conical rubber gasket 57 against the lower end of the pipe fitting 58, and to hold the cut-away side 56 of the pintle toward the left, as viewed in the drawings.

When used in this manner as a double action device, two of the units 15 are connected together, as shown in Fig. 4. For this purpose a pipe 59 connects the fitting 58 of each unit 15 to the T-connection 26 of the other unit, as best shown in Fig. 4.

Thus the fluid pressure will be admitted to the enlarged portion 46 of the passage 44 against the top 55 of the pintle 54 compressing the spring 50a and forcing the lower end of the pintle into the cylinder 16 providing a stop to limit the movement of the piston 31 toward the inlet end of the cylinder.

In the operation of the device, assuming that it is to be used as a single action device, for controlling a single action or vertical operation apparatus, the outlet fitting 30 of the single action device, as shown in Fig. 1, may be connected to the lower end of the cylinder of such vertical operation device.

As fluid under pressure is admitted to the inlet end of the cylinder 16, through the inlet passage 19, the fluid will move the piston toward the left, as viewed in said figure. As the fluid passes through the tortuous passages 33 in the piston it will cause a rotating or spinning movement of the piston as it moves toward the outlet end of the cylinder, this spinning movement of the piston producing a cushioning effect.

The fluid, after passing through the tortuous passages in the piston, will pass through the outlet passage 28 to the apparatus to be controlled by the device.

The piston 31 will gradually move toward the position shown in Fig. 2, compressing the spring 38 against the turbulence mixer 34 at the outlet end of the cylinder.

As the piston moves to the left of the passage 41, a portion of the fluid will by-pass the piston, passing through the passages 41, 40 and 39 to the peripheral groove 37 of the turbulence mixer, and then through the radial passages 36 and longitudinal passage 35 thereof, producing a turbulence of the fluid which increases the cushioning effect.

With the piston in the position shown in Fig. 2 equalization of pressure on both sides of the piston, due to passage of liquid through passages 33 of piston and through passages 43, 40 and 39, plus tension of spring 38, will move piston back to some position between Fig. 2 and Fig. 1, the pintle 34 preventing the piston from further backward movement. Assuming that a leak develops in the fluid inlet pipe 27, fluid pressure from the cylinder of the apparatus being controlled by the device will cause the piston 31 to move to the right, as viewed in the drawings, the piston contacting the conical end 52 of the stop pintle 48 overcoming the pressure of the oil and spring 50 in the chamber 46 and raising the same so that the piston will move into contact with the rubber gasket 22, as shown in Fig. 3, closing and sealing the passage 19 and preventing any further fluid from being discharged therethrough from the cylinder, thus cushioning the lowering movement of the piston or ram in the vertical cylinder of the single action fluid operated apparatus being controlled thereby and providing a fluid brake for holding the same against further downward movement.

In the cases where the device is used upon double-acting or horizontal fluid operated apparatus, such for instance as the double-acting hydraulic motor shown in Moushey and Hall Patent No. 2,540,903 of February 6, 1951, two of the units 15 are used, as shown in Fig. 4, and coupled together by the pipes 59 leading from the inlet pipe of each unit to the fitting 58 of the other unit. The outlet fitting 30 of each unit 15 is connected to one of the combined inlet and outlet passages of the hydraulic motor.

Thus the stop pintles 54 in both units will be depressed by fluid pressure, as shown in Fig. 2, limiting movement of the piston 31 to the right, as viewed in the drawings.

When fluid pressure is admitted to the inlet end of the cylinder 16 of either unit 15, the piston 31 thereof will be moved toward the outlet end of the cylinder and rotated by the fluid passing through the tortuous passage 33 therein, producing a cushioning effect which will be increased by the turbulence of the fluid produced by the turbulence mixer 34, the piston ultimately moving to the position shown in Fig. 2 completely compressing the spring 38.

The fluid under pressure entering one inlet of the hydraulic motor, or other apparatus being controlled by the device, will operate the motor smoothly and uniformly.

With the piston in the position shown in Fig. 2, assuming that a leak develops in the fluid inlet pipe 27, the reduction in fluid pressure upon the top of the pintle 54 will permit the spring 50a to move the pintle up, out of the cylinder, as shown in Fig. 3.

At the same time fluid pressure from the cylinder of the hydraulic motor or other apparatus being controlled by the device will cause the piston 31 to move to the right, as viewed in the drawings, the piston contacting the rubber gasket 22, as shown in Fig. 3, closing and sealing the passage 19 and preventing fluid from being discharged therethrough from the cylinder 15, cushioning the hydraulic motor or other apparatus controlled thereby and providing a fluid brake for holding the same against further movement.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. A fluid restrictor device for controlling fluid operated equipment, said device comprising a cylinder having a fluid inlet at one end and a fluid outlet at its opposite end for connection to such equipment, a fluid pressure feed line communicating with the fluid inlet, a piston slidably and rotatably mounted in the cylinder, there being a tortuous passage located longitudinally through the piston, said tortuous passage comprising two laterally offset passages extending part way through the piston from opposite ends of the piston and communicating laterally with each other at their inner ends, a turbulence mixer slidably mounted in the cylinder between the piston and the outlet end of the cylinder, said turbulence mixer having a longitudinal passage therethrough, a peripheral groove therearound and radial passages forming communication between the longitudinal passage and the peripheral groove, means providing communication between an intermediate portion of the cylinder and the peripheral groove of the turbulence mixer, means for normally limiting the movement of the piston toward the inlet, a shouldered neck at the inlet and a cooperating recess in the piston in which the neck may seat to close the inlet, fluid pressure from the fluid operated equipment overcoming said limiting means and causing the piston to move into closing contact with the inlet so that the inlet neck is seated in the recess of the piston in the event of leakage in said fluid pressure line.

2. A fluid restrictor device for controlling fluid operated equipment, said device comprising a cylinder having a fluid inlet at one end and a fluid outlet at its opposite end for connection to such equipment, a fluid pressure feed line communicating with the fluid inlet, a piston slidably and rotatably mounted in the cylinder, there being a tortuous passage located longitudinally through the piston, said tortuous passage comprising two laterally offset passages extending part way through the piston from opposite ends of the piston and communicating laterally with each other at their inner ends, a turbulence mixer slidably mounted in the cylinder between the piston and the outlet end of the cylinder, said turbulence mixer having a longitudinal passage therethrough, a peripheral groove therearound and radial passages forming communication between the longitudinal passage and the peripheral groove, means providing communication between an intermediate portion of the cylinder and the peripheral groove of the turbulence mixer, a spring interposed between the piston and the turbulence mixer, means for normally limiting the movement of the piston toward the inlet, a shouldered neck at the inlet and a cooperating recess in the piston in which the neck may seat to close the inlet, fluid pressure from the fluid operated equipment overcoming said limiting means and causing the piston to move into closing contact with the inlet so that the inlet neck is seated in the recess of the piston in the event of leakage in said fluid pressure line.

3. A fluid restricter device as set forth in claim 1, in which the means for normally limiting the movement of the piston toward the inlet is operated by fluid pressure from the fluid pressure feed line.

4. A fluid restricter device as set forth in claim 2, in which the means for normally limiting the movement of the piston toward the inlet is operated by fluid pressure from the fluid pressure feed line.

References Cited in the file of this patent

UNITED STATES PATENTS

| | | |
|---|---|---|
| 1,341,544 | Coffin | May 25, 1920 |
| 1,525,775 | Floyd | Feb. 10, 1925 |
| 1,603,668 | Duesenberg | Oct. 19, 1926 |
| 1,627,312 | Blust | May 3, 1927 |
| 2,046,030 | Muend | June 30, 1936 |
| 2,093,015 | Madden | Sept. 14, 1937 |
| 2,121,936 | Thomas | June 28, 1938 |
| 2,127,849 | Stone | Aug. 23, 1938 |
| 2,234,932 | Schlaupitz | Mar. 11, 1941 |
| 2,254,209 | Buttner | Sept. 2, 1941 |
| 2,386,585 | Blank | Oct. 9, 1945 |
| 2,402,171 | Lutes | June 18, 1946 |

FOREIGN PATENTS

| | | |
|---|---|---|
| 546,918 | France | Sept. 6, 1922 |